Dec. 5, 1967    G. G. GRUETTNER ETAL    3,356,022
TICKET RE-MARKER WITH ADJUSTABLE LENGTH
RIGHT ANGLE CUTTING MEANS
Filed Dec. 27, 1965

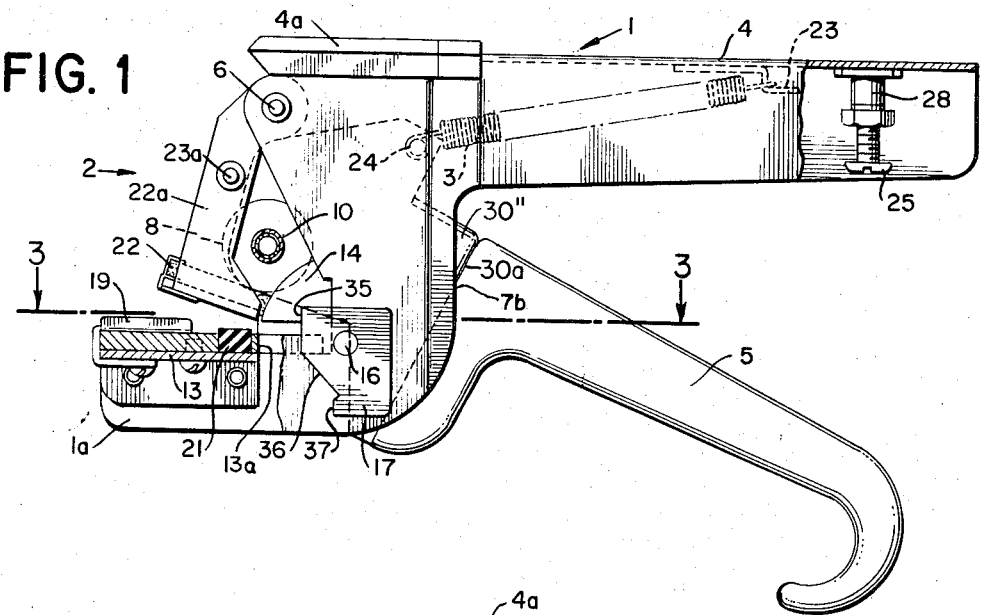

INVENTOR.
GERARD G. GRUETTNER
BY HANS J. BONHEIM

Nolte and Nolte
ATTORNEYS

Dec. 5, 1967    G. G. GRUETTNER ET AL    3,356,022
TICKET RE-MARKER WITH ADJUSTABLE LENGTH
RIGHT ANGLE CUTTING MEANS
Filed Dec. 27, 1965    6 Sheets-Sheet 4

INVENTOR.
GERARD G. GRUETTNER
HANS J. BONHEIM
BY
Nolte and Nolte
ATTORNEYS

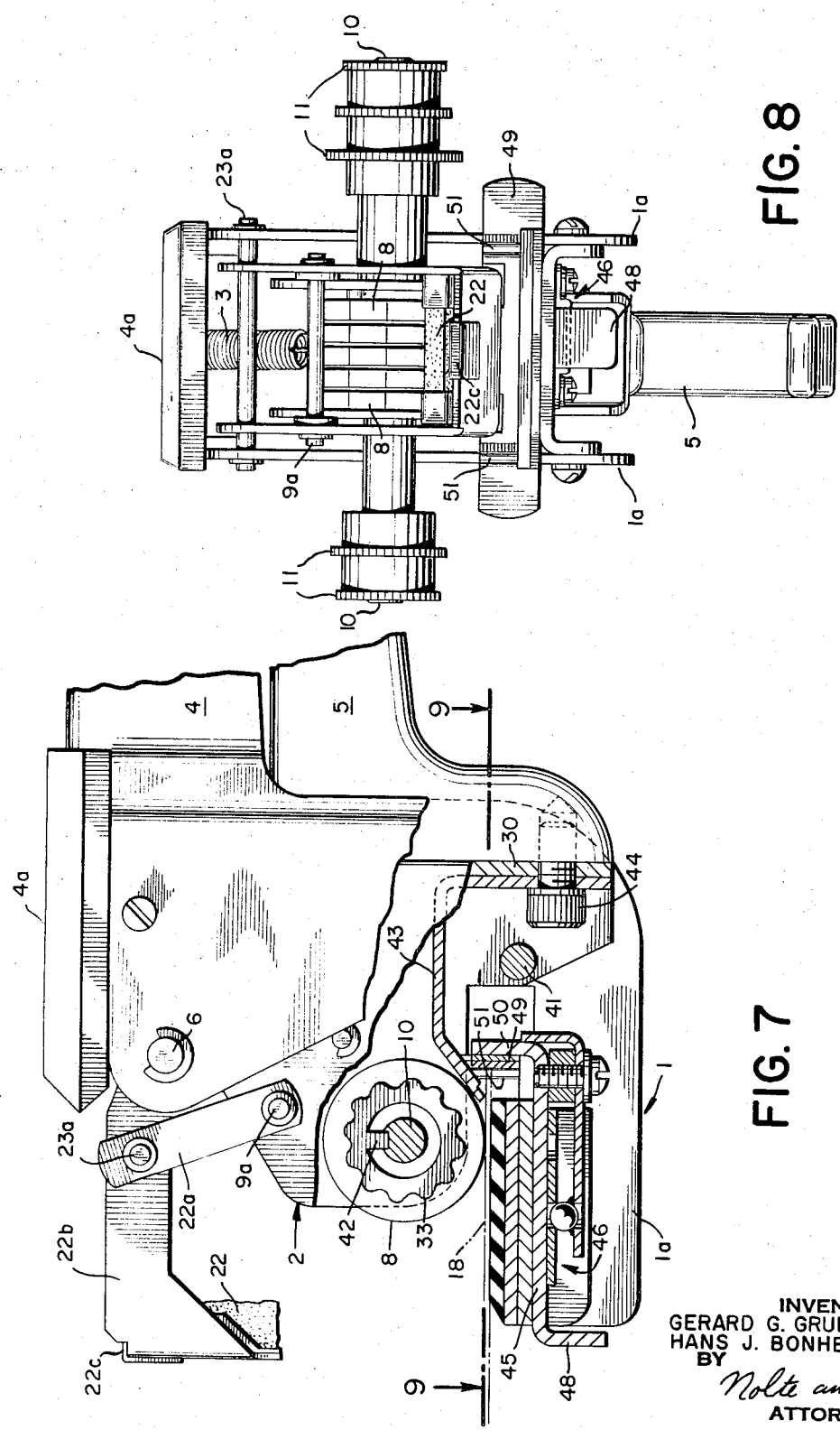

United States Patent Office 3,356,022
Patented Dec. 5, 1967

3,356,022
TICKET RE-MARKER WITH ADJUSTABLE LENGTH RIGHT ANGLE CUTTING MEANS
Gerard G. Gruettner, North Arlington, and Hans J. Bonheim, Fairlawn, N.J., assignors to Atlas Recording Machines Corporation, New York, N.Y., a corporation of New York
Filed Dec. 27, 1965, Ser. No. 517,192
3 Claims. (Cl. 101—97)

ABSTRACT OF THE DISCLOSURE

A manually operated ticket re-marker for severing a portion of a tag or ticket while simultaneously imprinting a new price on the ticket. Such re-marker is characterized by a cutter assembly and ticket aligning structure that enables right-angled severing operations for each ticket in a series of interconnected tickets. An alternative embodiment employs a line-cut means for crossing off a previous price while imprinting a new price upon the ticket.

---

This invention relates to a ticket re-marker, and in particular to a ticket re-marker adapted for imprinting new prices on sales tickets while simultaneously removing the previous price indicated on the tickets.

Ticket re-markers are known which cancel and imprint new prices on price tickets. However, these known ticket re-markers have deficiencies when a plurality of tickets are to be re-marked, that is, tickets which are connected with each other in the form of an endless string or series of tickets.

It is, therefore, an object of this invention to provide a ticket re-marker with which it is possible to remark an unlimited number of sales tickets, which are attached with each other in the form of an endless string, or series of tickets.

It is another object of the invention to provide a cutter in the ticket re-marker for cutting off an end portion of a ticket or tickets in a right angle cut.

It is a further object of the invention to provide a ticket re-marker which removes different lengths of the ticket so that the same sales ticket may be used, while the price listed thereon is altered several times.

Another feature of the invention includes, in a ticket re-marker, the provision of a line out means for lining out an old price on a ticket, or a series of tickets, and reprinting a new price thereon.

With these objects in view the invention provides a ticket re-marker which comprises a manually adjustable means arranged to stop and align the tickets, to define the length which is to be cut off from the sales ticket, while simultaneously imprinting a new price indication on the remaining portion of the ticket.

In accordance with the invention the ticket re-marker comprises stops so as to insure a correct insertion of the tickets into the ticket re-marker device. A ticket guide for guiding a single ticket is provided on a platen holder of the ticket device at one side thereof, and extending vertically thereto, in order to permit a straight introduction of a single ticket into the ticket re-marker.

In accordance with yet another feature of the invention, a plurality of imprinting means are pivotably arranged, laterally with respect to the ticket device. These pivotably arranged printing means, permit an easy and efficient adjustment for imprinting a given price onto a ticket.

Figure 3:
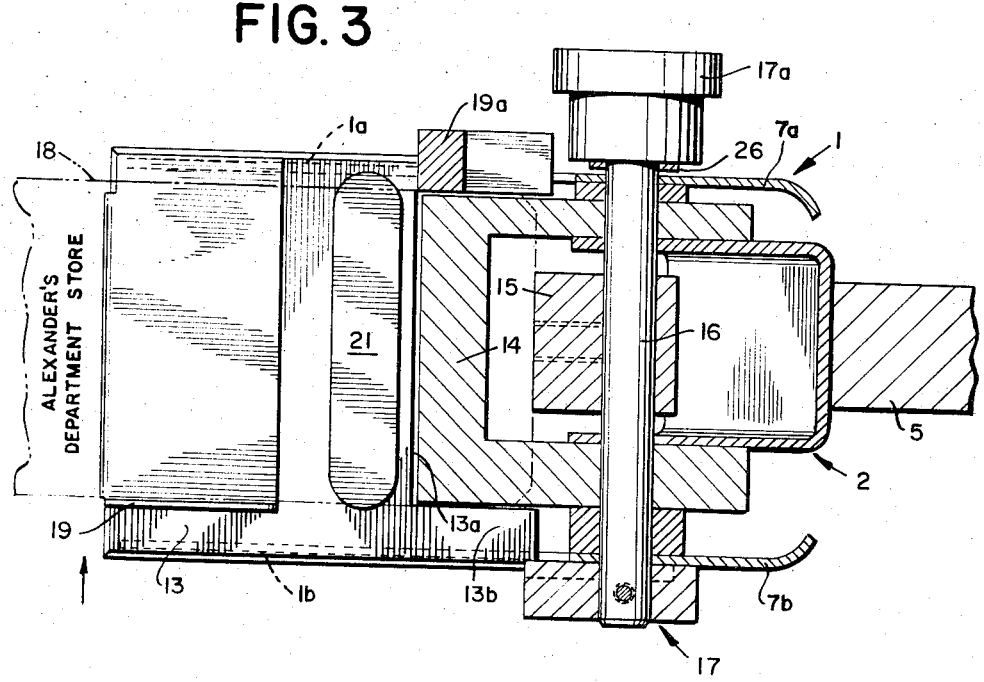
Figure 4:
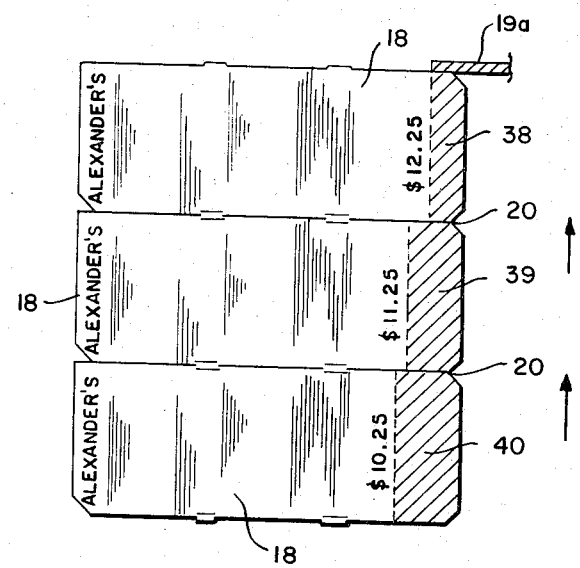
Figure 5:
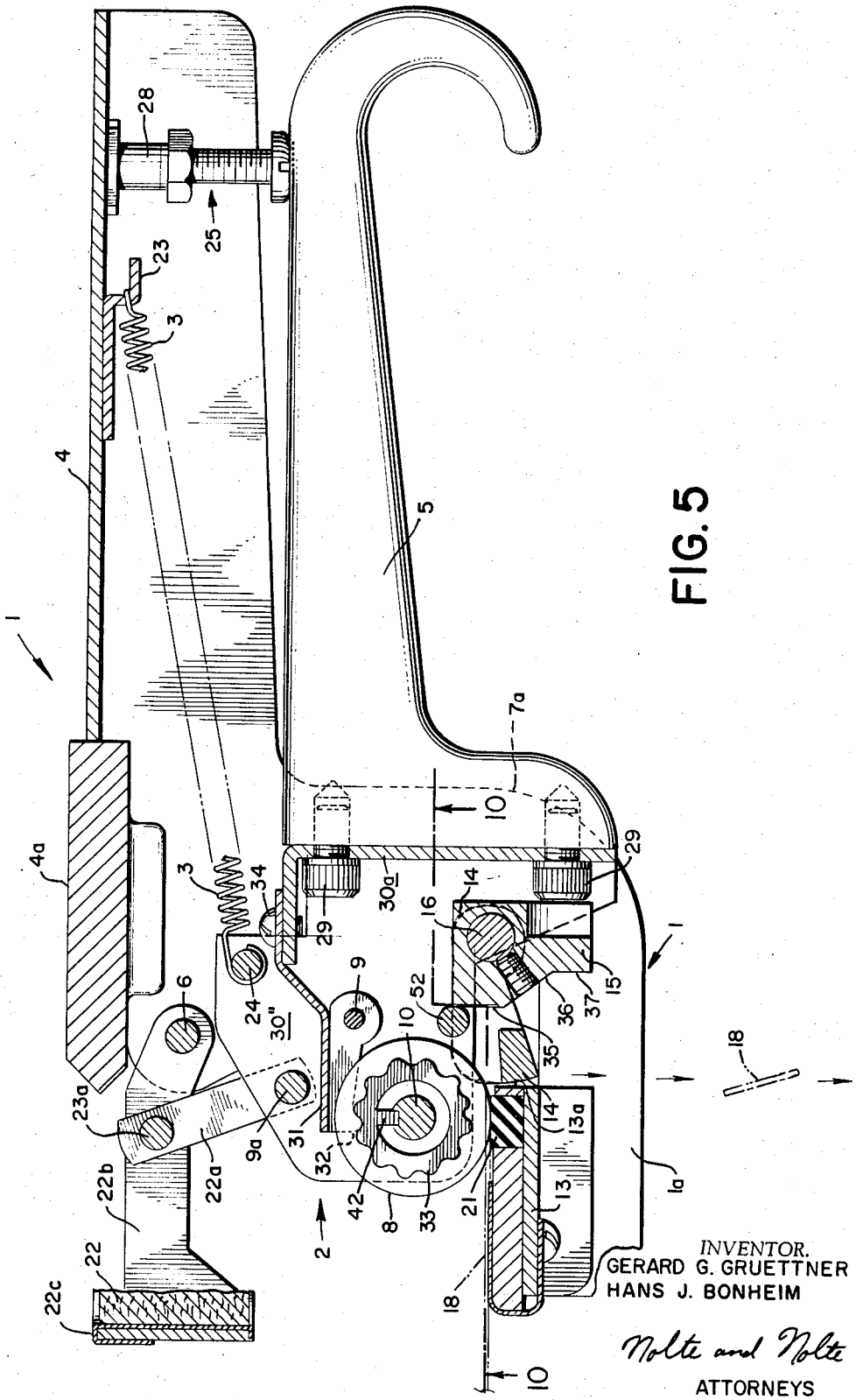
Figures 6, 11:
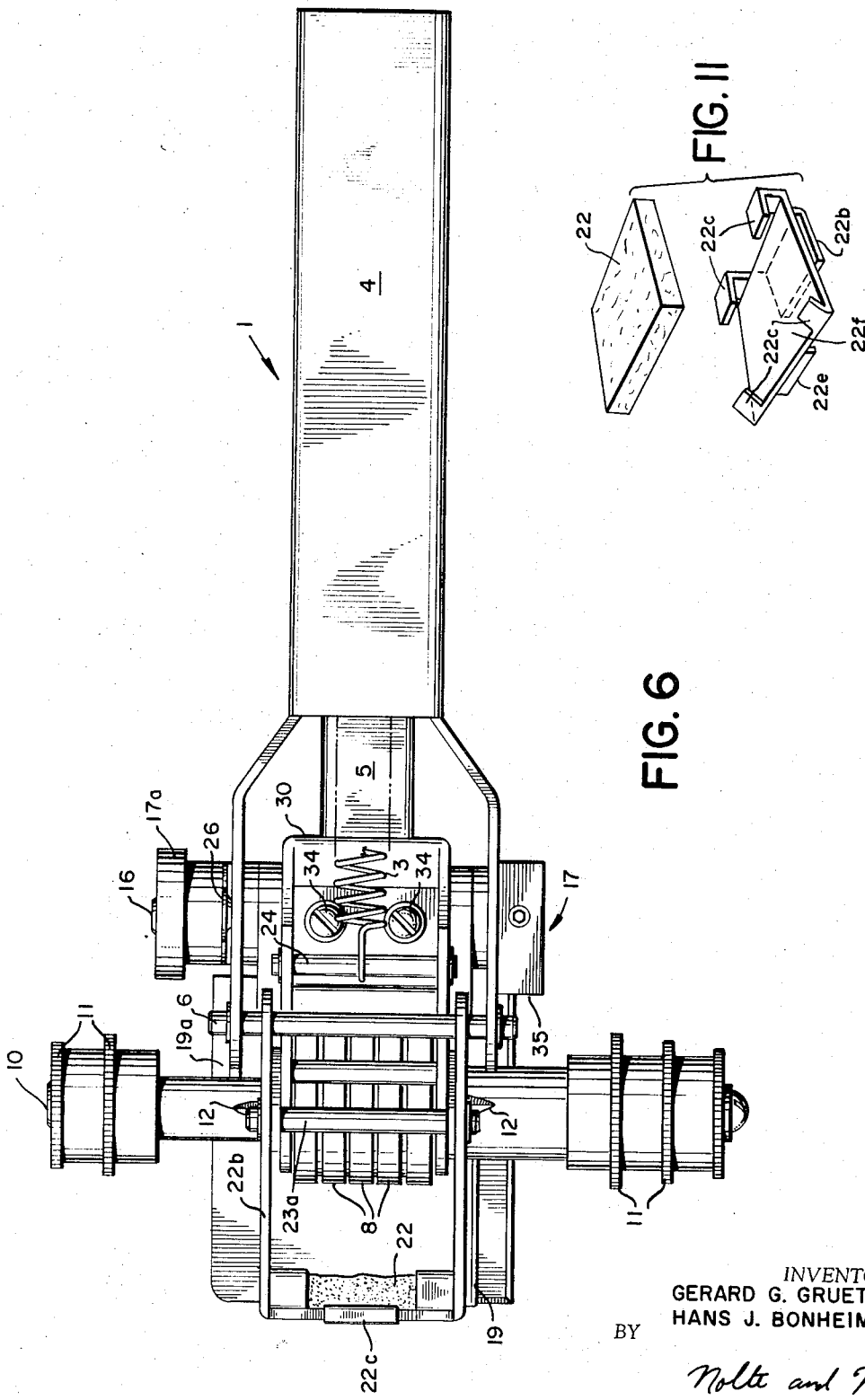
Figure 9:
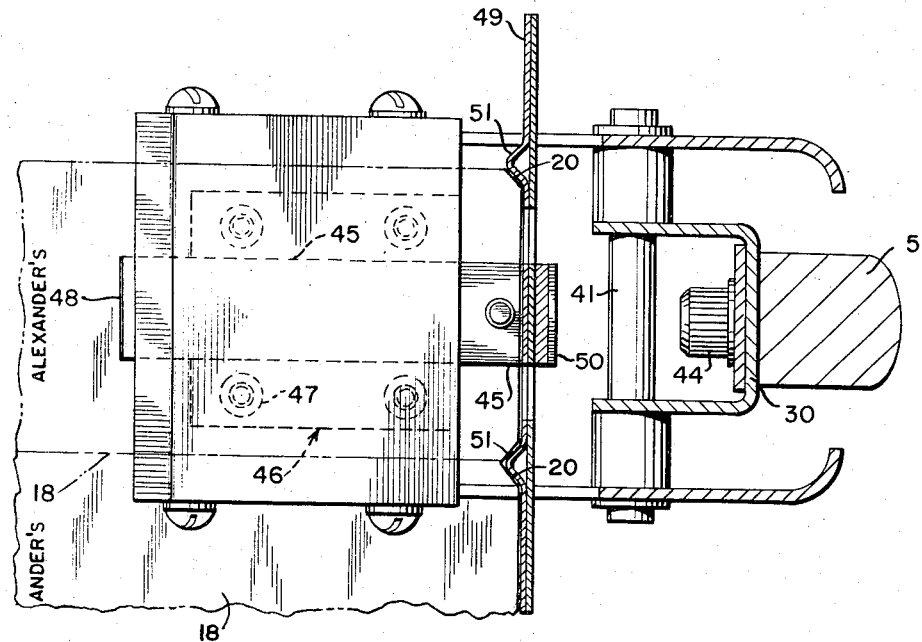
Figure 10:
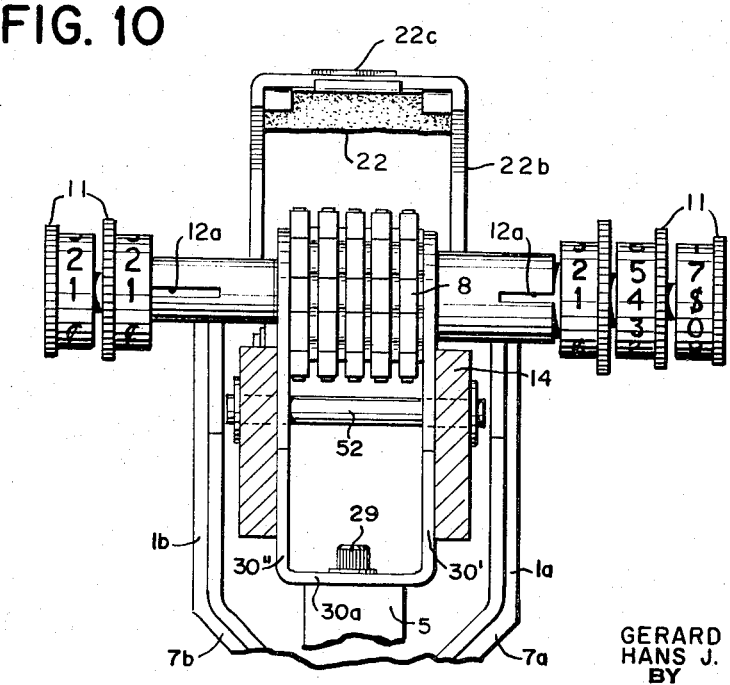

For a better understanding of the invention, its operating advantages and the specific objects attained by its use, reference should be had to the accompanying drawings and descriptive matter in which:

FIG. 1 is a side view, partly in section, of one embodiment of a ticket re-marker according to the invention;
FIG. 2 is a front view, partly in section, of the ticket re-marker shown in FIG. 1;
FIG. 3 is a horizontal cross-sectional view, on an enlarged scale, of a detail of FIGURE 1, such view being taken along line 3—3 of FIG. 1;
FIG. 4 is a diagrammatic view of a series of interconnected tickets with various cut-off lengths, such view not being drawn to scale;
FIG. 5 shows a side view, partly in section, of the embodiment shown in FIG. 1, showing the re-marker as it simultaneously marks and cuts the tickets;
FIG. 6 is a top plan view, of the ticket re-marker;
FIG. 7 is a side view, partly broken away, showing a detail of another embodiment of the invention according to FIG. 1;
FIG. 8 is a front view of the embodiment shown in FIG. 7;
FIG. 9 is a horizontal cross-sectional view of a detail of the embodiment shown in FIG. 7, such view being taken along line 9—9 in FIGURE 7; and
FIG. 10 is a horizontal cross-sectional view of a detail of the embodiment of FIGS. 1–6, such view being taken along line 10—10 of FIG. 5, and showing in particular the indicator slits.
FIG. 11 is a diagrammatic detailed view of the ink pad holder and the inkpad.

With reference to the figures, the embodiment shown in FIGS. 1–6 comprises a platen holder, generally indicated by reference number 1, and an imprinting holder generally indicated by reference number 2. Platen holder 1 consists of an integral yoke-like metallic frame. This frame, when viewed in vertical cross section (FIG. 1), comprises a bottom portion 1a, and a vertical leg portion 7a extending upwardly from portion 1a. Leg 7a terminates in a horizontally disposed upper handle 4, which extends rearwardly therefrom. Upper handle 4 extends horizontally with respect to lower handle 5, as shown in FIGS. 1 and 5.

As best illustrated in FIGS. 2 and 10, the yoke-like frame further includes an identical bottom portion 1b and a vertical leg portion 7b which similarly terminates in upper handle 4. For purposes of spatial orientation, portions 1a and 7a are located at the left side of the ticket re-marker when viewed from the front and portions 1b and 7b are located at the right side.

A torsion spring 3 has one end secured to a catch on the underside of handle 4 and has its other end secured to a shaft 24 extending horizontally through imprinting holder 2. This arrangement biases upper handle 4 away from lower handle 5 and enables the insertion of a ticket to be cut and remarked, as will be described hereinafter. A cover plate 4a is located adjacent to handle 4, for covering the upper part of the ticket device. Cover plate 4a is fixedly secured to the upper part of vertical leg portion 7a, by means of retaining screws (not shown).

A shaft 6, which extends through the upper portion of platen holder 1, adjacent upper handle 4, has an ink pad 22 pivotably mounted thereon. Ink pad 22 is further operatively connected to imprinting holder 2 for movement with respect thereto, by means of a linkage element 22a, (see FIG. 5). Linkage element 22a is movably connected at one end thereof to printing holder 2, by means of a pin 9a extending laterally through printing holder 2, and at the other end thereof, to a pin 23a which extends through holding means 22b of ink pad holder 22f. Ink pad 22 is connected to its holding means 22f, by resilient clamps 22c, (FIG. 5).

Ink pad holder 22f is provided with two lips 22d and 22e extending outwardly to clasp around the front and rear portions of ink pad holder means 22b. In this manner, ink pad holder 22f is firmly hold on the holding means 22b during the operation of the ticket re-marker. Should it become necessary to exchange a worn out ink pad with a new one, this may be done by simply removing the ink pad holder 22f by releasing lips 22d and 22e from holding means 22b.

A plurality of imprinting wheels 8 (FIG. 2) is rotatably mounted around the periphery of a shaft 10 which extends through imprinting holder 2.

Shaft 10 extends laterally with respect to imprinting wheels 8, as seen in FIGS. 2 and 5. Each of the wheels 8 can be set to a desired indicia by the setting of corresponding adjusting wheels 11 mounted at the ends of laterally extending shaft 10. The adjusting wheels 11 are marked with suitable indicia such as figures running from 0 to 9, and a dollar sign, so that a given price figure may be imprinted on the tickets. Each wheel 8 has a cam wheel 33 rigidly secured thereto.

A U-shaped saddle 30, as seen in FIGURE 10, forms an integral part of imprinting holder 2 and is spaced midway between vertical walls 7a and 7b of the frame. Saddle 30 is secured to lower handle 5 by a pair of screws 29 which join base member 30a to handle 5. Longitudinally spaced walls 30' and 30'' extend outwardly from base member 30a to define the saddle.

Saddle 30 pivots about shaft 16 as handle 5 is moved upwardly toward handle 4, as seen in FIGURE 5. A series of detent fingers 32 are pivotably mounted upon shaft 9, one finger being provided for each imprinting wheel 8. A like plurality of yieldable retaining springs 31 is fastened between plates 30' and 30'' so as to press downwardly upon fingers 32. Such downward pressure aligns the plurality of cam wheels 33 attached to imprinting wheels 8 by forcing fingers 32 into the notches in wheels 33. Springs 31 are fastened in operative position atop plate 30a by a fastening screw 34. Between both sides of printing holder 2, and adjusting wheel 11, casings 10a are provided with extensions 12 extending horizontally therefrom and into printing holder 2, to avoid a rotating movement of casings 10a. In order to assure a correct setting of the desired price, casings 10a are each provided with a slit 12a, on the lower side thereof, adjacent to adjusting wheels 11. When the desired numbers on the adjusting wheels 11 are in alignment with slits 12a, the user knows that the desired price has been correctly set.

Imprinting wheels 8 are mounted on a plurality of telescopic tubings (not shown) which are slipped over shaft 10. These telescopic tubings in turn are connected to the corresponding adjusting wheels 11. Imprinting wheels 8 are each provided with a cam wheel 33. The cam wheels 33, as well as the imprinting wheels have an inner diameter of different size which correspond to the outer diameter of the telescopic tubings onto which imprinting wheels 8 are mounted. A small extension 42, within the inner diameter of each of these cam wheels 33 engages corresponding notches of the telescopic tubings, so that wheels 8 are maintained in their adjusted position and turn with the telescoping tubings when turned by adjusting wheels 11.

As can be seen in FIGS. 1 and 2, the platen holder includes a plate 13, such member extending horizontally between portions 1a and 1b of the frame to provide a support for the ticket, or tickets, to be re-marked. Plate 13 is substantially rectangular in shape and has a rear edge 13a and a short rearwardly extending segment 13b, such relationships being seen in FIG. 3.

Cutter 14, which slopes downwardly at a slight angle when viewed from the front (FIG. 2) to facilitate its cutting operation, is located opposite rear edge 13a of platen 13, and in adjacency to segment 13b. This arrangement enables cutter 14 to perform a right-angle cutting operation on the inserted end portion of a ticket 18. This right-angle cutting operation is particularly advantageous when a series of imperforate tickets are to be re-marked. Such tickets may be attached as a group to a particular item, and may be subsequently disconnected from each other, whenever necessary, by conventional cutting means.

Cutter 14 is secured to saddle 30 by a shaft 52 which extends laterally through plates 30' and 30'' as seen in FIGS. 5 and 10. Thus, cutter 14 also pivots about main shaft 16 in response to movement of handle 5 toward handle 4.

The right angle cutting arrangement of cutter 14 permits the cut-off portion to fall free from the adjacent ticket. An adjustable ticket stop 15, for selecting the length of the segment to be severed from ticket 18, is provided within the instant re-marker behind cutter 14 so as to limit the depth of the insertion of the ticket 18 into the re-marker. The adjustable ticket stop is interconnected by a main shaft 16 to another laterally spaced stop 17, so that the stops are adjusted as a unit. Stop 17 is located to the outside of or exterior of bottom portion 1a, while inner stop 15 is located midway between bottom portions 1a and 1b of platen holder 1. Each ticket stop has a series of stepped surfaces 35 and 35', 36 and 36', 37 and 37', of different depths, as shown in FIGS. 1, 2 and 5. Thus, stops 15 and 17 not only align the ticket inserted into the re-marker, but also define the desired length to be severed from tickets 18 as shown in FIG. 4. The shaded areas 38, 39 and 40 on tickets 18, which progressively increase in size, as shown in FIG. 4, corresponds to the distances from the rear edge 13a of platen 13 to the stepped surfaces 35 and 35', 36 and 36', 37 and 37' of ticket stops 15 and 17. Thus, FIG. 4 illustrates that at least three successive reductions in price on a single ticket can be readily achieved by a simple manual adjustment of stops 15 and 17 as described hereinafter.

Adjusting knob 17a, which is mounted on one end of main shaft 16 is held in its adjusted position by means of a yieldable leaf spring 26. Leaf spring 26 is fixedly secured to adjusting knob 17a, and engages corresponding indentations (not shown) which are arranged on the outside of extension 7 of platen holder 1, whereby adjusting knob 17a is held in its adjusted position. When a ticket 18 is to be cut off in a predetermined length, the operator merely turns adjusting knob 17a, so that spring 26 falls on one of said indentations, each indentation corresponding to a certain cut off length. Inside adjustable ticket stop 15 and outside ticket stop 17, which are both mounted on main shaft 16, are thereby adjusted to the desired cut off length for a given ticket 18. Thus, an efficient and easily adjustable cut off arrangement for various lengths is created and it is possible to re-mark a ticket several times, due to the different lengths which may be cut from the ticket with this novel ticket re-marker. A fixed abutment 19a is located adjacent to the portion 1a of platen holder 1 so that the bottom edge of ticket 18 is aligned in two directions before the severing operation, i.e., the bottom of ticket 18 rests against stop 15 while the lower right edge of the ticket rests against abutment 19a. The direction of movement of the series of interconnected tickets is indicated by appropriate direction arrows in FIGS. 3 and 4.

When a plurality of tickets 18 are to be introduced into the ticket re-marker, inside stop 15, outside stop 17, as well as an abutment 19a mounted opposite outside stop 17 on the outside of the ticket re-marker, serve to insure a correct insertion of the tickets into the ticket re-marker. When a single ticket 18, or the last ticket of a series thereof is to be inserted into the re-marker, an additional ticket guide 19, in the form of an upturned lip, provides assistance in aligning one edge of the single ticket. Such lip is best seen in FIGS. 1 and 2 spaced inwardly a short distance from bottom portion 1a and located atop platen 13. It is noted that lip 19 is spaced from fixed abutment 19a a distance approximately equal to the width of a single ticket. Thus, while abutment 19a aligns the lower right hand corner of a ticket, lip 19 aligns the upper left hand edge of such ticket.

A pad 21 made of preferably soft material, like rubber, plastic, etc. is located near the rear of platen 13 and serves as support for tickets 18, it is also noted that a clearance space exists between rear edge 13a of platen 13 and stepped surface 35, 35' so that cutter 14 can pass freely therebetween, and the severed portion of tag 18 can fall therethrough as indicated by the directional arrows of FIG. 5. Conventional means (not shown), such as a detachable pouch or bag, can be provided to catch the severed tag segments, if so desired.

When tickets 18 are inserted into the ticket re-marker for the purpose of removing the old price marking and for re-marking a new price, upper handle 4 and lower handle 5 are pressed manually against the resistance of spring 3. When both handles are moving toward each other into a closing position, ink pad 22 is lifted away from imprinting wheels 8, by the cooperative action of lower handle 5 and linkage arrangement 22a. Simultaneously, imprinting wheels 8 and cutter 14, move into the imprinting and cutting position, respectively, for wheels 8 are located within a central recess in cutter 14, as seen in FIGURE 10. Thus, when lower handle 5 is completely pressed against upper handle 4, cutter 14 cuts a predetermined length off an inserted ticket 18, thus removing the old price from the ticket, while at the same time, imprinting wheels 8 imprint a new price on ticket 18. Spring 3 is connected with one end to upper handle 4 by means of a catch 23, and with its opposite end to a shaft 24 which is mounted in lower handle 5. For protecting against an embossing of tickets, that is, too much pressure by the operator, a screw 25 is vertically mounted with respect to upper handle 4. Screw 25 is mounted in a tapped holder 28, which is fixedly secured to the lower portion of upper handle 4, as can be seen from FIGS. 1 and 5.

In a further embodiment shown in FIGS. 7–9, a ticket re-marker is shown in which the essential parts are the same as those shown in the embodiment shown above. For the sake of simplicity, the modified embodiment will only be briefly described with respect to the parts necessary to explain the function of the inventive features thereof with similar parts being identified by the same reference numerals as in the first described embodiment. In accordance with conventional practice, cutter 14 is omitted when a line-out device is employed with the alternative form of re-marker shown in FIGS. 7–9. Alternatively, means could be provided to disable a cutter whenever a line-out mechanism is to be employed in conjunction with ticket remarking operations.

In cases where it would be desirable to line out the old price on a ticket, or a series of tickets 18, instead of cutting off the old price therefrom, the modified ticket re-marker comprises a line out means 43, which is movable together with the imprinting wheels 8. As can be seen from FIG. 7, line out device 43 is so arranged to line out an old price from a ticket 18, while simultaneously imprinting a new ticket 18 by imprinting wheels 8. Ink pad 22 supplies ink to both line out means 43 and imprinting wheels 8. Line out means 43 is secured at one end to handle 5 by means of a screw 44 (see FIG. 7), and extends at the opposite end toward imprinting wheels 8, within housing 30. Handles 4 and 5 are joined together by a main shaft 41, so that handle 5 can be moved relative to upper handle 4 by exerting a manual squeezing force on the handles. For purposes of orientation, main shaft 41 of the embodiment of FIGURES 7–9 corresponds to main shaft 16 of the preferred embodiment of FIGURES 1–6 and 10.

On the bottom of platen holder 1, a movable adjusting means 45 is mounted slidably in a cover plate 46. Cover plate 46 is mounted to the lower portion of platen holder 1, by means of four screws 47. The slidable adjusting means 45 comprises a hook like extension 48 extending toward the front end of platen holder 1. On the opposite end of the hook like extension 48, a ticket stop 49, or upturned lip, extends laterally with respect to wheels 8, and is mounted on a vertical extension 50 of movable adjusting means 45. The vertical ticket stop 49 is provided with a plurality of inverted V-shaped extensions 51. When a ticket 18, or a series of tickets are to be inserted into the ticket re-marker, for the purpose of lining out an old price thereon and simultaneously imprinting a new one, V-shaped notches 20 of ticket 18 engage the inverted V-shaped extensions 51 of ticket stop 49. Thus, ticket stop 49, not only is effective to define the printing location of the new price on the ticket, but it also serves as a guide for the inserted tickets.

The various features of novelty which characterize the invention are pointed out with particularity in the claims annexed hereto and forming a part of the specification.

What is claimed is:

1. A ticket re-marking device for progressively and individually removing the end portions of a row of interconnected price marking tickets and simultaneously imprinting a new price on said tickets adjacent said newly severed end portions, comprising a pair of pivotally connected handle means movable toward and away from each other, said handle means normally being spaced to define an open front portion, price marking means on one of said handle means, said marking means being shifted towards the other of said handle means in response to movement of said handle means towards each other, ticket support plate means on said other handle means in the path of said marking means, end stop means positioned adjacent said support plate means and forming an inner boundary of said front portion for depthwise aligning a marking ticket inserted into said front portion, a cut-out in said plate, said cut-out being defined by a first wall parallel to said end stop means, and a second wall disposed at an angle with respect to said first wall and extending outwardly therefrom, knife means mounted on said handle means for movement across said open front portion and through said cut-out in response to movement of said handle means towards each other, said knife means including portions disposed in close adjacency to said first and second walls when said knife means is shifted through said cut-out, and side stop means adjacent said support plate means at one side thereof, said stop means extending outwardly beyond said end stop and defining a lateral boundary of said open portion in spaced relation to said second wall for sidewise alignment of said tickets with respect to said marking means and said cut-out, said side stop means, after severance of the end portion of the first ticket of an interconnected series, cooperating with the side edge formed by said first cut to laterally align the next ticket of said series with said marking means and cut-out.

2. A device as defined in claim 1 wherein said side stop means is spaced from said second wall portion a distance substantially equal to the width of said ticket.

3. A device as defined in claim 1 wherein an auxiliary side stop means is positioned atop said ticket support plate means, said auxiliary side stop means having an upturned lip for assisting in the sidewise alignment of a single ticket.

No references cited.

ROBERT E. PULFREY, *Primary Examiner.*

H. DINITZ, *Assistant Examiner.*

UNITED STATES PATENT OFFICE
CERTIFICATE OF CORRECTION

Patent No. 3,356,022 December 5, 1967

Gerard G. Gruettner et al.

It is hereby certified that error appears in the above numbered patent requiring correction and that the said Letters Patent should read as corrected below.

Column 6, line 69, strike out "No references cited." and insert instead

References Cited
UNITED STATES PATENTS

| | | | |
|---|---|---|---|
| 1,042,436 | 10/1912 | Hobart | 83-597 |
| 1,473,089 | 11/1923 | Faust | 83-597 |
| 2,014,727 | 9/1935 | Flood | 101-90 |
| 2,122,412 | 7/1938 | Flood | 101-90 |
| 2,943,559 | 7/1960 | Rothmann | 101-90 |
| 3,157,116 | 11/1964 | Reiner | 101-110 |

Signed and sealed this 1st day of April 1969.

(SEAL)
Attest:

EDWARD M. FLETCHER, JR.
Attesting Officer

EDWARD J. BRENNER
Commissioner of Patents